United States Patent
Garrido et al.

(12) 
(10) Patent No.: US 6,312,037 B1
(45) Date of Patent: Nov. 6, 2001

(54) SEAT ADJUSTER QUICK INSTALL MOUNT

(75) Inventors: Pascal E. Garrido, Gravehurst; Mark Volkmann, Bracebridge, both of (CA); Joseph Allen Wilbanks, II, Hermitage, TN (US); Nathan Allen Clark, Warren, MI (US); Gregory D. Collins, Gravehurst; Christopher Clifford, Bracebridge, both of (CA); Jack P. Pogodzinski, Orion, MI (US)

(73) Assignee: Dura Global Technologies, Rochester, Hills, MI (US)

( * ) Notice: Subject to any disclaimer, the term of this patent is extended or adjusted under 35 U.S.C. 154(b) by 0 days.

(21) Appl. No.: 09/433,452

(22) Filed: Nov. 4, 1999

(51) Int. Cl.[7] ....................................................... B60N 2/04
(52) U.S. Cl. ..................................... 296/65.13; 296/65.03
(58) Field of Search ................................... 296/63, 65.13, 296/65.03; 297/463.1, 463.2

(56) References Cited

U.S. PATENT DOCUMENTS 4,927,201 * 5/1990 Froutzis .................................. 296/63
5,697,727 * 12/1997 Harry .................................. 296/63 X
6,145,173 * 11/2000 Suzuki et al. ....................... 296/63 X

* cited by examiner

*Primary Examiner*—Stephen T. Gordon
*Assistant Examiner*—Jason Morrow
(74) *Attorney, Agent, or Firm*—C. R. Kiczek

(57) ABSTRACT

A vehicle seat mounting assembly includes a mounting pin rotatably retained in a support foot to removably retain a seat track assembly to a vehicle floor member. The support foot is located on the vehicle floor member and the mounting pin is moved downward through a slot in the vehicle floor member. The mounting pin is rotated within the support foot and released such that the biasing member moves the mounting pin upward into a receipt member. Another embodiment of the vehicle seat mounting assembly includes a pin having an engagement surface. The mounting pin is passed through the vehicle floor member an into a receipt member. To retain the mounting pin in the receipt member, a spring biased locking member engages the engagement surface of the mounting pin. The receipt member is preferably mounted such that the receipt member can move or "float" relative to the vehicle floor member such that during receipt of the mounting pin, various tolerance variations between the seat and the vehicle floor member are accommodated.

22 Claims, 4 Drawing Sheets

SEAT ADJUSTER QUICK INSTALL MOUNT

BACKGROUND OF THE INVENTION

This invention relates generally to an assembly for mounting a seat within a vehicle. More particularly, this invention relates to a locking mechanism that provides a releasable mount for a vehicle seat.

Seat track arrangements for mounting seats within vehicles are generally well known. The seat track assemblies provide for a vehicle seat to be adjusted in forward and rearward direction. To provide the adjustment, a first seat track is typically movable relative to a second seat track. The second seat track is a stationary track that is securely fastened to the vehicle floor.

It is common to mount the seat track arrangements directly to the vehicle floor by threaded fasteners such as nuts and bolts. The bolts are commonly mounted at each end of the seat tracks to extend through the seat track and the vehicle floor where it is threaded into the nut. This provides a secure mounting arrangement that assures that the seat track assembly and thus the vehicle seat are securely fastened to the vehicle.

Although the mounting of the seat track with threaded fasteners provides a secure attachment of the seat to the vehicle, it is rather time consuming to attach each fastener in an assembly environment. Further, access to the fasteners may be limited and particular assembly operations must be sequenced to assure that access to the fasteners is readily available.

Another matter of general concern with the mounting of the seat track is the emergency removal after an accident, or later maintenance that requires removal of the seat. The seat is typically originally installed prior to installation of the instrument panel and other interior components. This allows for easy access to the fasteners. However, during a later repair that requires removal of the seat, it is relatively difficult to gain access to the fasteners.

Accordingly, it is desirable to provide a seat mounting assembly that provides effective retention of the seat to the vehicle, yet allows improved attachment and removal of the seat.

SUMMARY OF THE INVENTION

One embodiment of the present invention provides a seat mount that is preferably attached to a stationary seat track. The seat mount includes a support foot having a rotatable mounting pin that is preferably of an L-shape. A stop is fixedly mounted to the pin to retain a biasing member such as a spring between the stop and the support foot.

In use, the support foot is located on the vehicle floor member and the pin is moved downward through a slot in the vehicle floor member. While the pin is being pressed in the downward direction against the force of the biasing member, the pin is rotated within the support foot. The pin is then released such that the biasing member moves the pin upward into a receipt member. The support foot and the seat are thereby removably attached to the vehicle floor member.

Another embodiment of the seat mount includes a pin having an engagement surface. The pin is passable through the vehicle floor member an into a substantially cup-shaped receipt member. To retain the pin in the receipt member, a spring biased locking member engages an engagement surface on the pin.

In use, the locking member is retracted against the force of the biasing member by a removable tool or the like. The pin can then be installed or removed from the receipt member without the necessity of threaded fasteners.

The receipt member is preferably mounted such that the receipt member can move or "float" relative to the vehicle floor member prior to receiving the pin. By allowing the receipt member to "float" relative to the vehicle floor member during receipt of the pin, various tolerance variations between the seat and the vehicle floor member are accommodated.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
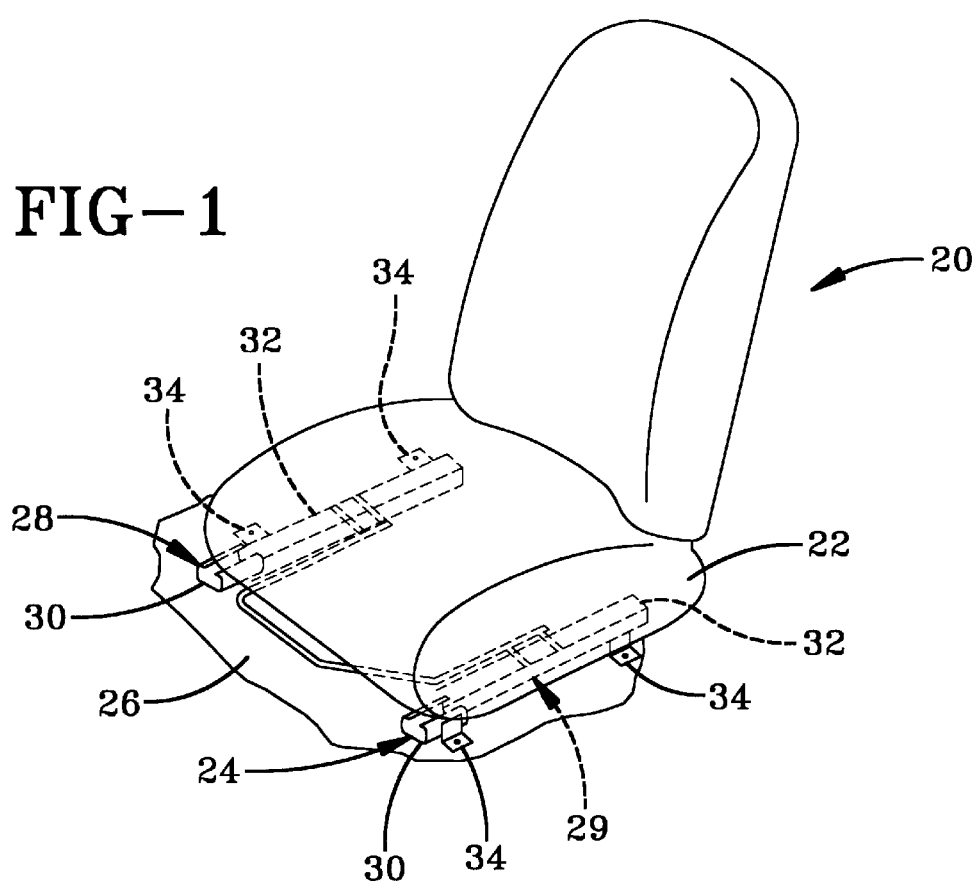
FIG. 1 is a diagrammatic, perspective illustration of a seat with a seat track mounting assembly designed according to this invention.

FIG. 1 diagrammatically illustrates a vehicle seat assembly 20. The seat assembly includes a seat base portion 22 that is mounted within the vehicle on a track assembly 24 attached to a vehicle floor member 26. The track assembly 24 includes tracks on an inboard side 28 and an outboard side 29. The terms inboard and outboard used in this specification are in reference to a driver's position for clarity and illustration purposes only and cannot be considered limiting.

The track assembly 24 include a stationary first track 30 attached to the vehicle floor member 26 and a movable second track 32 attached to the seat base portion 22. The movable second track 32 engages the first stationary track 30 so that the movable second track 32 can be moved in a forward or rearward direction relative to the first track 30.

A seat mount 34 attaches the track assembly 24 to the vehicle floor member 26. The seat mount 34 is preferably located near each corner of the track assembly 24. As will be further described below, the seat mount 34 includes a mounting pin 38 that allows the vehicle seat 20 to be removably installed to the vehicle floor member 26 without the necessity of a threaded fastener.

Figure 1A:
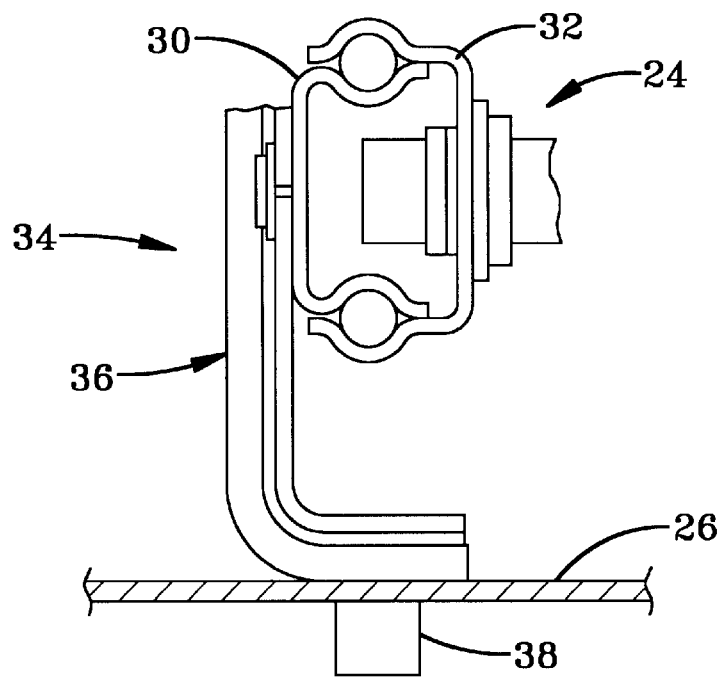
FIG. 1A is a sectional view taken along the line Y—Y of FIG. 1 of a vertically oriented seat track assembly for use with this invention.
Figure 1B:
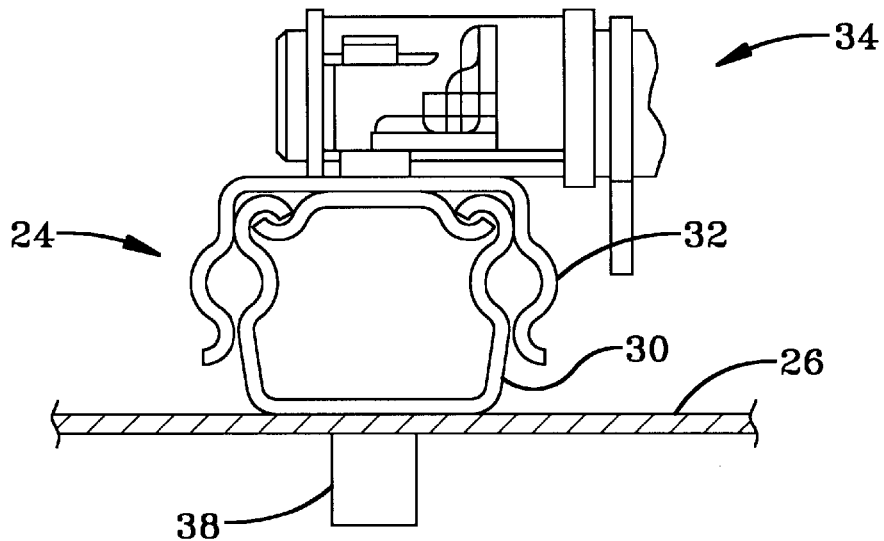
FIG. 1B is a sectional view taken along the line Y—Y of FIG. 1 of a horizontally oriented seat track assembly for use with this invention.

FIG. 1A illustrates a seat mount 34 having a support foot 36 as a component separate from the mounting assembly 24. The seat mount 34 is attached to the stationary first track 30 and supports the mounting pin 38 to mount the seat 20 to the vehicle floor member 26. However, as shown in FIG. 1B, depending on the orientation of the first track 30 and second track 32, the stationary first track 30 itself can be the seat mount 34. The first track 30 includes the mounting pin 38 and the first track 30 is supported directly on the vehicle floor member 26.

Figure 2:
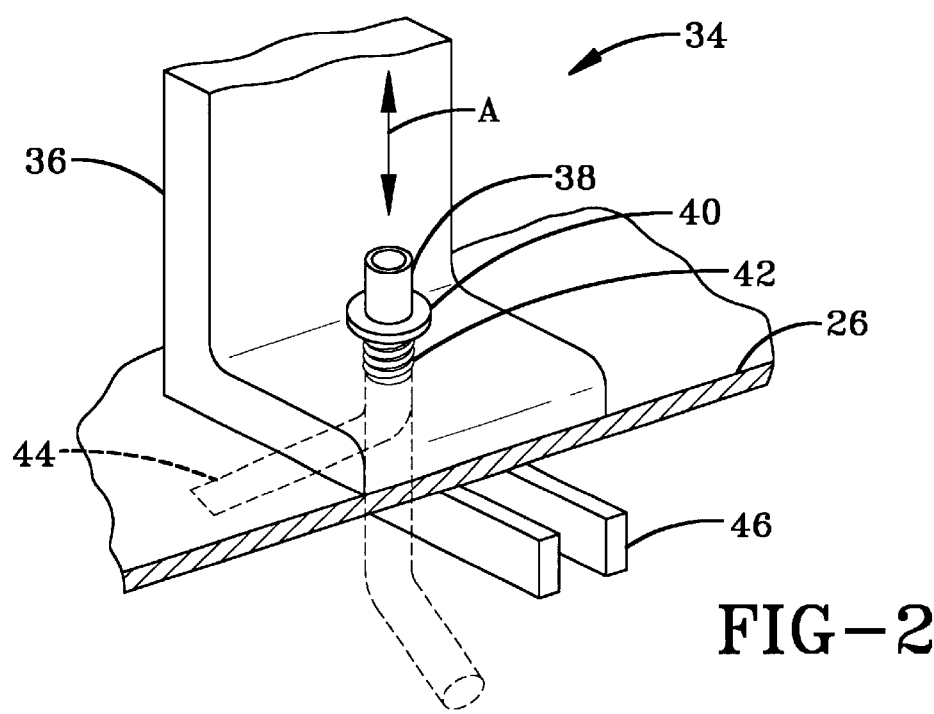
FIG. 2 is an expanded perspective view of a seat track mount designed according to this invention.

FIG. 2 further illustrates the seat mount 34 attached to the vehicle floor member 26. The support foot 36 contains a rotatable mounting pin 38 that is preferably of an L-shape. A stop 40 is fixedly mounted to the pin 38 to retain a biasing member 42 such as a spring between the stop 40 and the support foot 36. The biasing member 42 provides an upward force on the pin 38 relative to the support foot 36. The force of the biasing member 42 must therefore be overcome to move the pin 38 in a downward direction.

As will be described in more detail below, the support foot 36 is located on the vehicle floor member 26 is located on the vehicle floor member 26 and the pin is moved manually downward through a slot 44. While the pin 38 is being pressed in the downward direction against the biasing member 42, the pin 38 is rotated within the support foot 36. The pin 38 is then released such that the biasing member 42 moves the pin 38 upward in the opposite direction along arrow A and into receipt member 46. The support foot 36 and thus the seat mount 34 is securely attached to the vehicle floor member 26.

Figure 3:
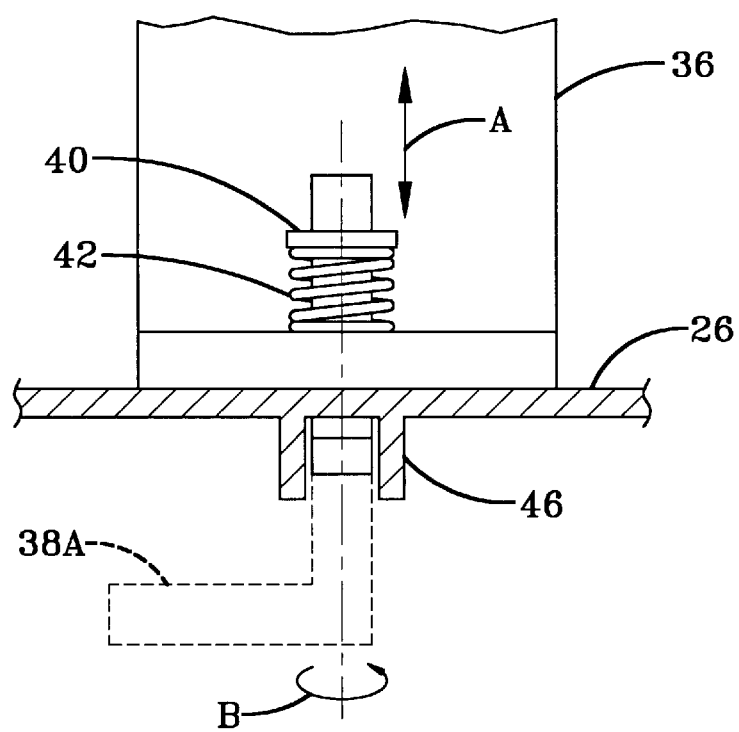
FIG. 3 is a perspective, front view of a seat track mount of the embodiment of FIG. 2.

FIG. 3 illustrates a front view of the support foot 36 located on the vehicle floor member 26. The pin 38 is shown in phantom at 38A after being passed through the slot 44 (FIG. 2) while being pressed in the downward direction along arrow A against the biasing member 42. After passing through the slot 44 the pin 38 is rotated in the direction of arrow B into alignment with the receipt member 46. The pin 38 is then released such that the biasing member 48 moves the pin 38 upward in the opposite direction along arrow A and into the receipt member 46.

Figure 4:
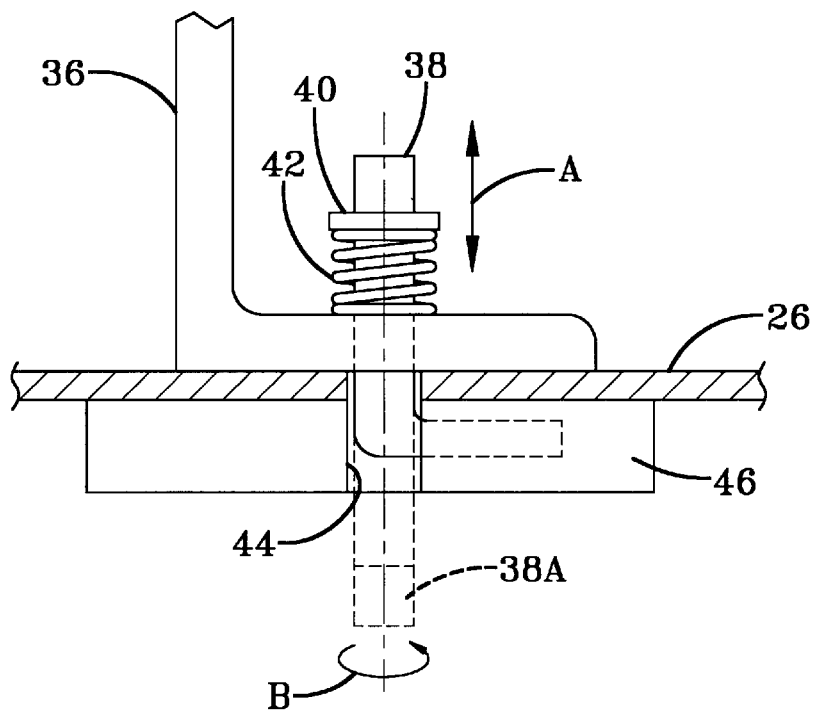
FIG. 4 is a perspective, side view of a seat track mount of the embodiment of FIG. 2.

FIG. 4 illustrates a side view of the support foot 36 located on the vehicle floor member 26. The pin 38 is again shown in phantom at 38A after being passed through the slot 44 while being pressed in the downward direction along arrow A against the force of biasing member 42. After passing through the slot 44 the pin 38 is rotated in the direction of arrow B into alignment with the receipt member 46

As shown in FIG. 4, receipt member 46 is preferably a channel located along the underside of the vehicle floor member 26. Although a channel is disclosed, one skilled in the art will understand that other receipt members 46 can be used. It should be realized that the receipt member 46 can be integral to the vehicle floor member 26. Further, the vehicle floor member 26 can be integral to a vehicle frame, or a bracket or the like attached thereto. Accordingly, by providing a receipt member 26 to receive pin 38, the vehicle seat 20 (FIG. 1) is removably installed.

Figure 5:
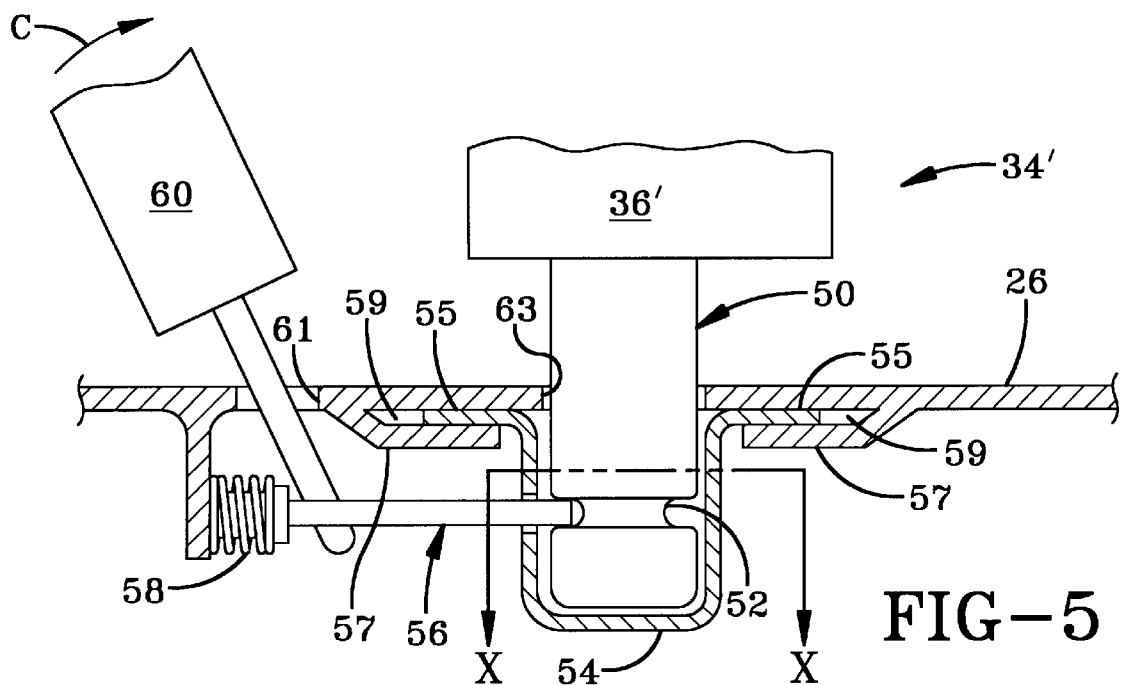
FIG. 5 is another seat track mount designed according to this invention.

FIG. 5 illustrates another embodiment of the seat mount 34' attached to the vehicle floor member 26. The seat mount 34' again includes a support foot 36'. However, the support foot 36' can similarly be the stationary first track 30 as described above.

The seat mount 34' generally includes a pin 50 having an engagement surface 52. The pin 50 is passable through the vehicle floor member 26 an into a receipt member 54. A locking member 56 is preferably biased by a biasing member 58 such that the locking member 56 engages the engagement surface 52 such as a groove in the pin 50.

The receipt member 54 is preferably a substantially cup-shaped member mounted adjacent the vehicle floor member 26. The receipt member 54 can be integral to the vehicle floor member 26. However, in the disclosed embodiment of FIG. 5, the receipt member 54 is preferably mounted such that the receipt member 54 can move or "float" relative to the vehicle floor member 26 prior to receiving the pin 50.

The receipt member 54 includes a flange 55 that fits within corresponding tabs 57 in the vehicle floor member 26. The tabs 57 preferably provide a clearance space 59 between the flange 55. The receipt member is thereby allowed to move or "float" within the confines of the clearance space 59.

An enlarged opening 63 of a greater diameter than the pin 50 is provided in the vehicle floor member 26. The pin 58 is thus received through an opening 63 that is greater than the pin 50 diameter. Accordingly, by allowing the receipt member 54 to "float" relative to the vehicle floor member 26 during receipt of the pin 50, various tolerance variations between the seat 20 (FIG. 1) and the vehicle floor member 26 are accommodated.

To retain the pin 50 in the receipt member 54, the locking member 56 engages the engagement surface 52. The locking member 56 is preferably located below and substantially parallel to the vehicle floor member 26.

In use, the locking member 56 is retracted against the force of the biasing member 58 by a removable tool 60 or the like. The removable tool 60 fits through an access opening 61 in the vehicle floor member 26 and preferably engages the locking member 56. The tool 60 s pivoted in the direction of arrow C and the locking member 56 is retracted against the biasing member 58. The pin 50 can then be installed or removed from the receipt member 54. Although a removable tool 60 is disclosed, one skilled in the art will understand that an integral latch assembly can be used to operate the locking member 56.

Figure 6:
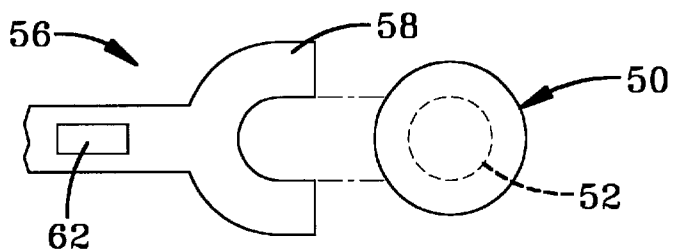
FIG. 6 is a section view taken along the line X—X of FIG. 5 illustrating an embodiment of the locking member according to the present invention.

FIG. 6 illustrate a sectional view taken along the line X—X in FIG. 5. The locking member 56 includes a substantially C-shaped engagement surface 58. The C-shaped engagement surface 58 enters the corresponding engagement surface 52 or groove of the pin 50 to securely retain the pin 50 in the receipt member 54. The locking member preferably provides a slot 62 that receives the removable tool 60 (FIG. 5).

Figure 7:
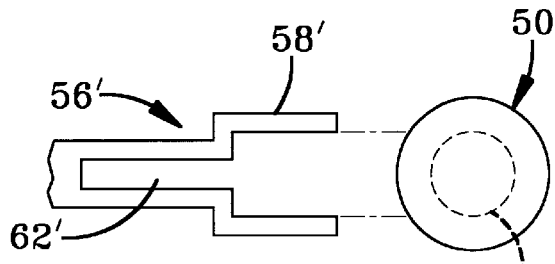
FIG. 7 is a section view taken along the line X—X of FIG. 5 illustrating another embodiment of the locking member according to the present invention.

FIG. 7 illustrates another embodiment of the locking member 56' having substantially U-shaped engagement surface 58'. The U-shaped engagement surface 58' similarly enters the corresponding engagement surface 52 or groove of the pin 50 to securely retain the pin 50 in the receipt member 54. A slot 62' again receives the removable tool 60 (FIG. 5) to retract the locking member 56'.

Figure 8:
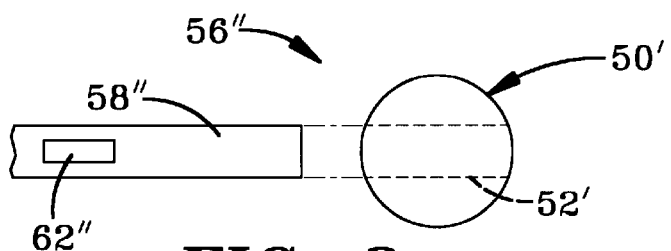
FIG. 8 is a section view taken along the line X—X of FIG. 5 illustrating yet another embodiment of the locking member according to the present invention.

FIG. 8 illustrates yet another embodiment of the locking member 56". The engagement surface 58", however, is a male fitting which engages a female engagement surface 52' extending through the pin 50' to securely retain the pin 50 in the receipt member 54. A slot 62" receives the removable tool 60 (FIG. 5) to retract the locking member 56".

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An assembly for mounting a seat within a vehicle, comprising:
   a first track assembly;
   a movable second track assembly in movable mating engagement with said first track assembly;
   a mounting pin attached to said first track assembly;
   a receipt member adjacent a vehicle floor member;
   said mounting pin engageable with said receipt member such that said first track does not move relative to the vehicle floor member; and
   wherein the mounting pin is installed and removed from the receipt member without threaded fasteners.

2. The assembly according to claim 1, wherein said mounting pin is rotatably attached to said first track assembly.

3. The assembly according to claim 1, wherein said mounting pin is biased toward a locked position by a spring.

4. The assembly according to claim 1, wherein said mounting pin is substantially L-shaped.

5. The assembly according to claim 1, wherein said mounting pin has an engagement surface to receive a locking member.

6. The assembly according to claim 1, wherein said receipt member is a channel.

7. The assembly according to claim 1, wherein said receipt member is a substantially cup-shaped member adjacent the vehicle floor member.

8. An assembly for mounting a seat within a vehicle, comprising:
   a first track assembly;
   a movable second track assembly in moveable mating engagement with said first track assembly;
   an L-shaped mounting pin rotatably attached to said first track assembly;
   a receipt member attached below a vehicle floor member; and
   said mounting pin removably engageable with said receipt member such that said first track does not move relative to the vehicle floor.

9. The assembly according to claim 8, wherein said mounting pin is biased toward a locked position.

10. The assembly according to claim 8, wherein said receipt member is a channel attached below the vehicle floor.

11. The assembly according to claim 8, wherein said mounting pin is rotatably attached to a support foot attached to said first track assembly.

12. An assembly for mounting a seat within a vehicle, comprising:
    a first track assembly;
    a movable second track assembly in movable mating engagement with said first track assembly;
    a mounting pin having an engagement surface, said mounting pin attached to said first track assembly;
    a substantially cup-shaped receipt member adjacent a vehicle floor member;
    a locking member engageable with said engagement surface;
    said mounting pin removably engageable into said receipt member, said locking member engageable with said engagement surface such that said first track does not move relative to the vehicle floor member; and
    wherein the mounting pin is installed and removed from the receipt member without threaded fasteners.

13. The assembly according to claim 12, wherein said receipt member includes a flange, said flange being movably fitted between a tab member and the vehicle floor member.

14. The assembly according to claim 12, wherein said receipt member is integral to the vehicle floor member.

15. The assembly according to claim 12, wherein said locking member is integral to the vehicle floor member.

16. The assembly according to claim 12, wherein said locking member includes a U-shaped engagement surface.

17. The assembly according to claim 12, wherein said locking member includes a C-shaped engagement surface.

18. The assembly according to claim 12, wherein said locking member includes a male engagement surface and said mounting pin includes a female engagement surface said male engagement surface receivable within said female engagement surface.

19. The assembly according to claim 12, wherein said locking member is biased toward a locked position.

20. An assembly for mounting a seat within a vehicle, comprising:
    a first track assembly;
    a movable second track assembly in movable mating engagement with said first track assembly;
    a mounting pin attached to said first track assembly;
    a receipt member adjacent a vehicle floor member;
    said mounting pin engageable with said receipt member such that said first track does not move relative to the vehicle floor member; and
    wherein said mounting pin is substantially L-shaped.

21. An assembly for mounting a seat within a vehicle, comprising:
    a first track assembly;
    a movable second track assembly in movable mating engagement with said first track assembly;
    a mounting pin attached to said first track assembly;
    a receipt member adjacent a vehicle floor member;
    said mounting pin engageable with said receipt member such that said first track does not move relative to the vehicle floor member; and
    wherein said receipt member is a channel.

22. The assembly according to claim 1, wherein said mounting pin is free of threads over a portion engageable with the receipt member.

* * * * *